B. Hufnagel,
Photographic Bath,
No. 1,074, Reissued Nov. 13, 1860.
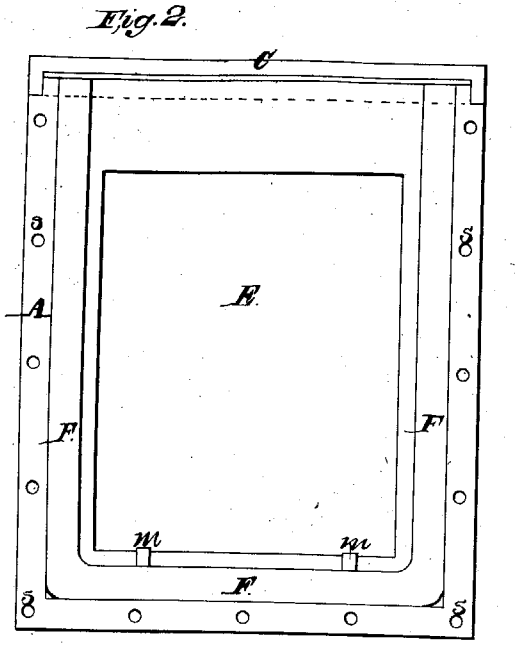
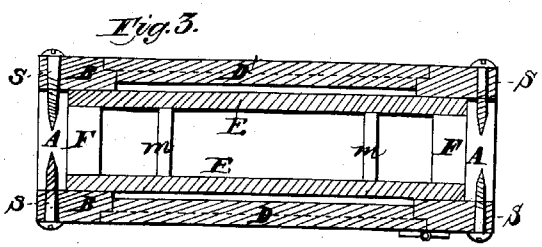
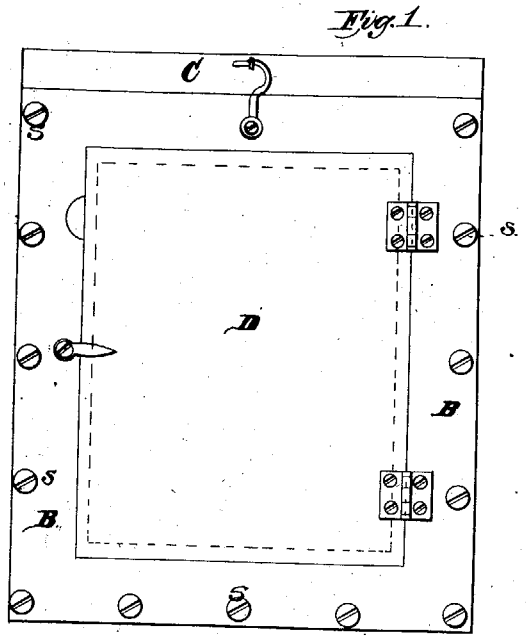
Witnesses.
Henry A. Bowler
Julian Kuen
Inventor.
Bernhard Hufnagel.

UNITED STATES PATENT OFFICE.

BERNHARD HUFNAGEL, OF NEW YORK, N. Y.

IMPROVEMENT IN PHOTOGRAPHIC BATHS.

Specification forming part of Letters Patent No. 21,679, dated October 5, 1858; Reissue No. 1,074, dated November 13, 1860.

*To all whom it may concern:*

Be it known that I, BERNHARD HUFNAGEL, of New York, in the county and State of New York, have invented a new and useful Improvement in Photographic Baths; and I hereby declare that the following is a full and exact description of the same, reference being had to the accompanying drawings, and to the letters of reference marked thereon.

Figure I represents an outside view, Fig. II a cross-section, and Fig. III a horizontal section, of my improved silver baths.

The nature of my invention consists in the construction of silver baths for photographic and ambrotype purposes, principally of the largest size, which shall require the smallest quantity of solution of silver, and at the same time preserve said solution from all foreign, action, so as to be able to use the same a great number of times, and until the silver is all absorbed; and, further, in the manner of constructing and arranging the outer casing, so as to give ready access to the inner case or bath, for the purpose of examining the same, and likewise to allow the same at any time to be tightened up to prevent any leakage.

In the accompanying drawings, A is a framing to which the front and back sides, B B′, are fastened by means of screws *s*, so as to form, jointly, a close, tight box or outer casing.

C is a cover, turning on hinges, and fitting tight over the ends of said box, and secured by a small staple-hook, *p*. The front and back sides B, and B′, are arranged with doors or panels D D′, to be able to see the inner box, and so arranged as to close perfectly tight and not to admit any light to the inside of the box when closed.

E E are two pieces of plate-glass, fitted to the inside of this box, with a piece of vulcanized india-rubber, F, between the outer edges of the plate-glass, on both sides and bottom, forming together a box open on the top end. Instead of one continued piece of india-rubber, several pieces may be used. The cover of the box is, on the inside, lined with a thin sheet of india-rubber, *n*, to prevent any detrimental action of the solution upon the wooden part of the box.

*m m* are small pieces of india-rubber fastened to the bottom for the photograph or ambrotype plates to rest on.

In constructing and putting together this silver bath the thickness of the plate glasses E E and of the india-rubber F is made, according to the size of the bath, from one-eighth of an inch to half an inch thicker than the inside of the outer wooden box measures, and is then as much pressed together by means of the screws *s*, whereby a perfectly tight joint is obtained between the sides of the india-rubber and the plate-glass, which forms, then, the inner box to contain the chemical solution. If at any future time this inner box should begin to leak, the width of the framing A can easily be reduced to allow the india-rubber piece F to be more compressed by means of the said screws *s*.

I am aware that silver baths have been made of gutta-percha, china, and different other materials, either cast in one piece or made out of several pieces and connected together in different manner. The objections to all these plans are, that they take too great a quantity of the chemical solution, thereby increasing considerably the expense, and that most of those materials, and principally where cement is used, are more or less affected by the silver, and which, in their turn, act again upon the solution of silver, thereby producing impurities in the bath which are detrimental to the pictures placed in said bath.

By my improved construction of the outer wooden box or casing I am able to see at any time if the silver bath or chemical solution is clear and pure, without emptying the same into a glass bottle, as is the case with most other constructions, and as no kind of cement is used to produce a perfectly tight box, the same may at any time be easily taken apart and cleaned, besides requiring only a very small quantity of the solution to fill the bath, and as neither the glass nor the vulcanized india-rubber are affected by the silver, and produce in their turn likewise no bad effect upon the solution, I can use the same longer than is at present the case, without refilling or removing the same.

What I claim as my invention, and desire to secure by Letters Patent, is—

1. The construction of a silver bath for photographic and ambrotype purposes, made out of two plates of glass, with india-rubber packing between, and fastened together between wooden or other frame-work, in the manner and for the purpose substantially as specified.

2. The construction of the outer or wooden box or case, and the manner of fastening the same together by screws *s*, for the purpose and in the manner as set forth.

3. The arrangements of doors or panels D D′ in the front and back sides B, and B′, of the outer box or casing, for the purpose substantially as described.

BERNHARD HUFNAGEL.

Witnesses:

HENRY E. ROEDER,
JULIAN KEEN.